United States Patent [19]

Naudin

[11] Patent Number: 4,751,991
[45] Date of Patent: Jun. 21, 1988

[54] DIAPHRAGM CLUTCH MECHANISM
[75] Inventor: Jacky Naudin, Asnieres, France
[73] Assignee: Valeo, Paris, France
[21] Appl. No.: 889,928
[22] Filed: Jul. 28, 1986
[30] Foreign Application Priority Data Jul. 29, 1985 [FR] France ............................ 85 11539

[51] Int. Cl.⁴ ...................... F16D 13/44; F16D 13/58
[52] U.S. Cl. .............................. 192/89 B; 192/70.27
[58] Field of Search ........................... 192/89 B, 70.27

[56] References Cited

U.S. PATENT DOCUMENTS

| 4,039,059 | 8/1977 | de Gennes | 192/89 B |
| 4,084,674 | 4/1978 | de Gennes | 192/89 B |
| 4,602,708 | 7/1986 | Nagano | 192/89 B |

FOREIGN PATENT DOCUMENTS

| 2843272 | 4/1980 | Fed. Rep. of Germany | 192/89 B |
| 2843317 | 4/1980 | Fed. Rep. of Germany | . |
| 2459904 | 2/1976 | France | . |
| 2473140 | 1/1980 | France | . |
| 2456878 | 1/1981 | France | 192/89 B |

Primary Examiner—Rodney H. Bonck
Attorney, Agent, or Firm—Charles E. Brown; Charles A. Brown

[57] ABSTRACT

A diaphragm clutch mechanism comprises a cover, at least one pressure plate, a diaphragm and assembly apparatus securing the diaphragm to the cover. The assembly apparatus comprises on the one hand, retaining members which are coupled to the cover and which have an axial part passing through the diaphragm and an end wing bent over with the aid of a notch in the axial part and defining with the said axial part a wedging elbow, and, on the other hand, a ring wedged in the wedging elbow. According to the invention, the ring is of frustoconical shape with a rounded outer ridge forming a secondary abutment and with inner ridges in contact respectively with the axial part and the end wing of at least one of the retaining members. The invention is particularly applicable to diaphragm clutches for motor vehicles.

2 Claims, 2 Drawing Sheets

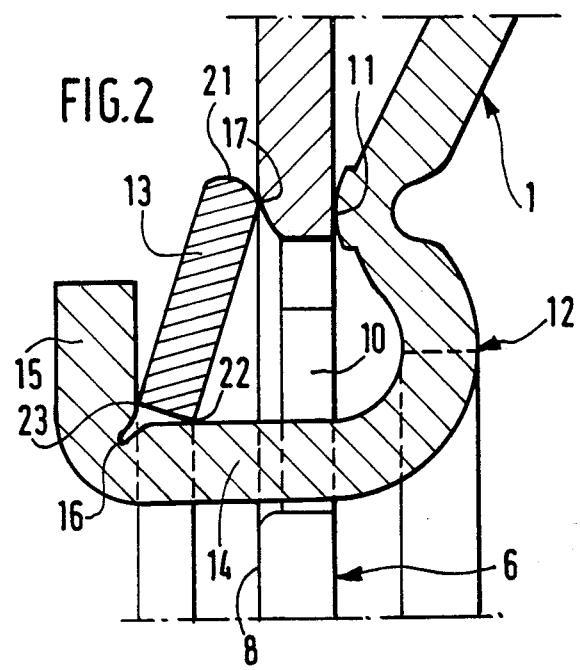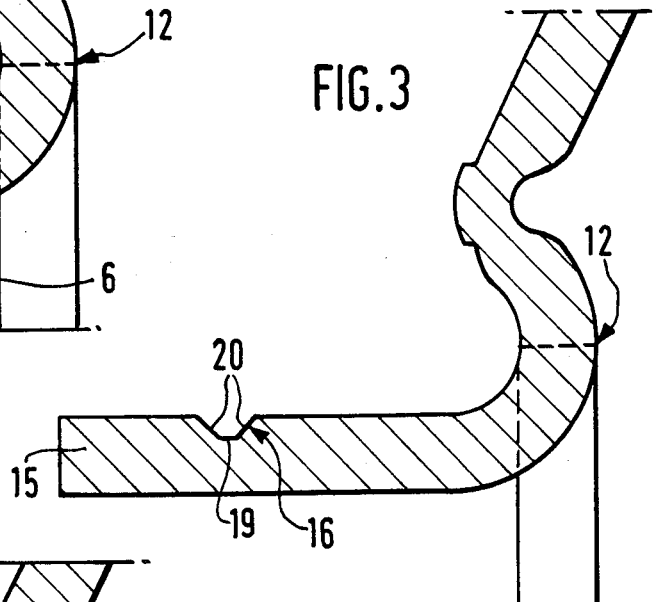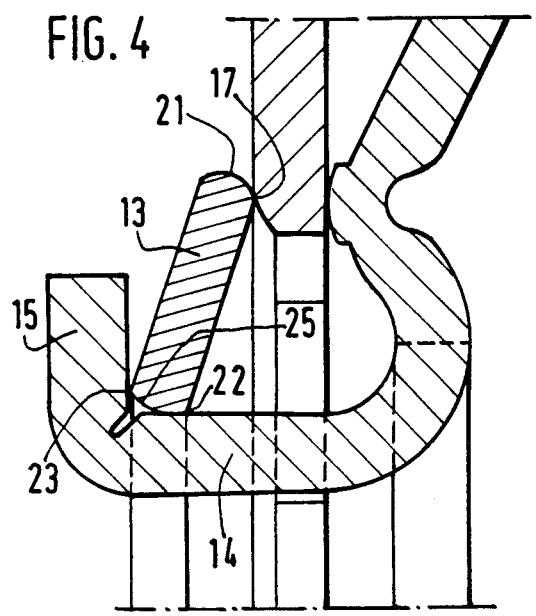

DIAPHRAGM CLUTCH MECHANISM

BACKGROUND OF THE INVENTION

1. Field of the Invention

The present invention relates, in general terms, to diaphragm clutch mechanisms, especially for motor vehicles, of the kind comprising a substantially annular cover, at least one pressure plate intended to be fixed to the cover in rotation whilst being movable relative thereto, a substantially annular diaphragm comprising a peripheral part forming a Belleville washer for acting on the pressure plate, and a central part fragmented into radial fingers for engagement by a clutch release bearing, and assembly means pivotally securing the diaphragm to the cover by continously urging said diaphragm axially, under an elastic clamping load, against a primary abutment located on the cover, said assembly means comprising, on the one hand, retaining members which are coupled to the cover and which have an axial part passing through the diaphragm via passages formed between the radial fingers of the diaphragm and an end wing bent with the aid of a notch in the axial part thereof and defining together with the said axial part a wedging elbow, and, on the other hand, a ring wedged in the said wedging elbow and designed to provide a secondary abutment for the diaphragm which is disposed substantially opposite the primary abutment.

Such a clutch mechanism is intended to be attached by means of its cover to a reaction plate, integral with a first shaft, (usually a drive shaft) with the interposition between the reaction plate and the pressure plate of a friction disc fixed in rotation to a second shaft, (usually a driven shaft). Arranged around the driven shaft is a clutch release bearing, operable to act on the radial fingers of the diaphragm to disengage the clutch from its normally engaged condition in which the pressure plate clamps the friction disc against the reaction plate under the action of the Belleville washer bearing on the primary abutment.

2. Description of the Related Art

Such a clutch mechanism is described in French patent application No. 76/05,485 of Feb. 27, 1976, for which there is at least in part a corresponding U.S. Pat. No. 4,084,674, and comprises, on the one hand, relatively thin and flat retaining members and, on the other hand, a ring which is centered on the axial part of the said retaining members via the edge of its inner periphery having a substantially flat radial orientation portion in contact with the wedging elbow. Furthermore, the said ring has, on its outer periphery, a part in the form of a wide-open V for forming the secondary abutment and for stiffening the said ring. Thus, this ring has a twisted shape with, in cross-section, a radial portion, an inclined portion and another portion inclined in the opposite direction to the preceding one.

Such a device has been and still is satisfactory.

Nevertheless, the advantage of this device is that it has a ring of relatively high rigidity and that, to keep the diaphragm constantly applied against the primary abutment, it exerts on the said ring a considerable prestress which increases the hysteresis effect of the diaphragm even more when it tilts between the primary and secondary abutments, and causes wide load variations in proportion to the unavoidable operational wear of the diaphragm and the abutments between which it is tiltably mounted.

To overcome these disadvantages, it is possible to replace this ring by a thinner spring-steel ring, as described in German patent application No. 2,843,317 of Oct. 4th 1978, but such a solution is expensive and the ring is not located in its entirety radially beyond the axial part of the retaining members, thus making assembly more complicated.

SUMMARY OF THE INVENTION

The object of the invention is, in general terms, to mitigate these disadvantages and thus provide a device which makes it possible to reduce the axial clamping load by the use of an economical solution.

According to the invention, a diaphragm clutch mechanism of the kind referred to above is characterized in that the ring is of frustoconical shape with a rounded outer ridge forming a secondary abutment and with inner ridges in contact respectively with the axial part and the end wing of at least one of the retaining members.

Thus, running counter to accepted pratice and ideas, according to which the inner periphery of the radial orientation ring is necessary not only for good centering of the said ring, but also to counteract an opening action of the latter during the bending of the end wing, in combination with the stiffening of the outer periphery of the said ring by means of the V-shaped part, the present invention makes it possible to obtain a ring of simplified manufacture and therefore of less cost, but at the same time having high clamping accuracy, particularly as a result of the notch in the retaining members and because of a reduction in the production tolerances of the said ring.

According to another characteristic of the invention, the inner edge of the ring is rounded.

By means of this feature, the rounded inner edge of the ring can slide axially along the axial part of the retaining members during the operation of bending the end wing, without the risk that it will become embedded.

According to another embodiment, the clutch mechanism is characterized in that the notch has a trapezoidal profile in cross-section, the said notch having a flat base between two sloping lateral flanks.

This arrangement is especially advantageous in combination with the crown ring according to the present invention, since it makes it possible to bend the end wing at an angle greater than 90° and form a wedging elbow having an acute angle in axial section. This presents an additional possibility of deformation of the crown ring, thus making it possible, by modifying the angle of the truncated cone of the latter, to obtain greater accuracy in the clamping force of the diaphragm between its primary and secondary abutments.

BRIEF DESCRIPTION OF THE DRAWINGS

FIG. 2 is a view, on a larger scale, of a detail of FIG. 1 corresponding to the insert II.

FIG. 3 is a partial view in axial section of a retaining member before its end is bent over.

FIG. 4 is a partial view in axial section of an alternative form of the ring according to the invention.

DESCRIPTION OF THE PREFERRED EMBODIMENT

Figure 1:
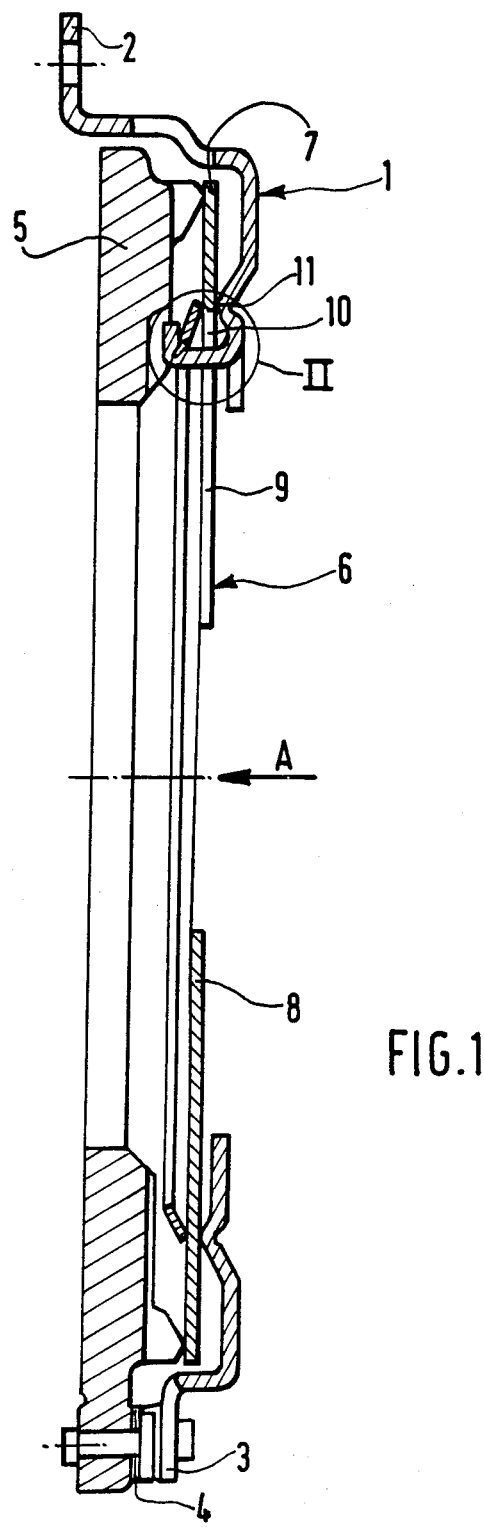
FIG. 1 is a view of a clutch mechanism according to the invention in axial section.

As can be seen from FIG. 1, the clutch mechanism according to the invention comprises a substantially annular cover, equipped on its outer periphery with a first series of coplanar zones 2, by means of which it can be fastened to a reaction plate or flywheel (not shown), and with a second series of coplanar zones 3 which are set back relative to the preceding zones and by means of which it is coupled via tongues 4 to a pressure plate 5, and a substantially annular diaphragm 6, comprising a peripheral part 7 forming a Belleville washer, for acting on the pressure plate 5, and a central part fragmented into radial fingers 8 separated two by two by slots 9 obtained from passages 10 made between the fingers 8, in the region in which the latter are connected to the Belleville washer 7 of the diaphragm 6, the outer periphery of which acts on the pressure plate 5.

The tongues 4 fix the plate 5 to the cover 1 in rotation, whilst at the same time allowing the said plate axial movability relative to the cover 1.

The diaphragm 6 is interposed axially between the cover 1 and the pressure plate 5, so as to allow a friction disc, not shown here, inserted between the pressure plate 5 and the reaction plate or flywheel, to be clamped between the latter plates or flywheel under the action of the diaphragm.

A movable clutch release bearing is adapted to act on the radial ends of the radial fingers 8 of the diaphragm 6 which are nearest to the axis of the mechanism and has a direction of action indicated by the arrow A in FIG. 1.

Assembly means are provided to pivotally secure the diaphragm 6 to the cover 1 under an elastic clamping load which keeps it constantly applied against a primary abutment 11 carried by the cover 1 and, in the example illustrated, consisting of a boss of the cover 1.

As can be seen in FIG. 2, these assembly means comprise, on the one hand, relatively thin and flat retaining members 12 distributed circularly and coupled to the cover 1 and, on the other hand, a ring 13 wedged by means of these retaining members. More particularly, these members comprise an axial part 14 passing through the diaphragm 6 via the passages 10 made in the latter in the vicinity of the root of the radial fingers 8, and an end wing 15 bent with the aid of a notch 16 in the axial part 14 and defining, with the said axial part, a wedging elbow. Here, therefore, these retaining members are thin radially and elongate circumferentially and are in one piece with the cover as a result of bending in the region of its primary abutment 11.

Wedged in this elbow is the ring 13 which thus extends in its entirety radially beyond the axial parts and which forms for the diaphragm 6 a secondary abutment 17 arranged substantially opposite the primary abutment 11 formed by the cover.

In practice, as illustrated in FIG. 3, before such a diaphragm clutch mechanism is assembled, the end wing 15 of the retaining members 12 is straignt and parallel to the axis of the unit as a whole, whilst being in alignment with the axial part 14.

To form the end wing 15, the retaining members 12 are provided transversely over their entire width with a notch 16 which is open in the opposite direction to the axis of the unit as a whole and locally reduces its thickness and which, in cross-section, has a trapezoidal profile having a flat base 19 between two sloping lateral flanks 20. The bending line is thus brought about by this otch 16. It will be noted that the depth of the notch is between 0.15 e and 0.30 e, e being the thickness of the lug (retaining member).

As can be seen from FIG. 2, according to the invention the ring 13 is of frustoconical shape with, on the one hang, a rounded outer profile or ridge 21 which forms a secondary abutment 17 and makes it easier for the diaphragm to tilt and which, during production, underwent cold-hammering to improve the wearing resistance of the secondary abutment and, on the other hand, inner profiles or ridges 22, 23 which are in spaced radial offset relation relative to each other and in contact respectively with the axial part 14 and the end wing 15 of at least one of the retaining members 12.

Thus, after the diaphragm 6 and the ring 13 have been engaged on a retaining member 12, the end 15 is bent radially on contact with the ring 13, as can be seen in FIG. 2, here at right angles and in the opposite direction to the axis of the unit as a whole, in order to obtain the device according to FIG. 2. If required, bending can be carried out at an angle greater than or less tnan a right angle, this being made possible by the trapezoidal shape of the notch 16 and as a result of the interaction of the wing 15 and the ridge 23, the other ridge 22 sliding on the axial part during this operation. As a result of such bending of the end wing 15, these retaining members 12 exert on the ring 13 a prestress which has a load greater than that of the diaphragm 6 in the region of the clutch release bearing A and thus keep the diaphragm 6 and more particularly the inner peripheral part of its Belleville washer constantly up against the primary abutment 11.

This arrangement makes it possible to centre the ring 13 by means of its inner ridge 22 and, during the operation of bending the end wing 15, obtain, by means of its inner ridge 23 furthest away from the diaphragm, an accurate clamping force of the said ring.

As a result, there is no need to use a spring steel ring, a simple sheet-metal ring being sufficient.

According to the alternative form shown in FIG. 4, the ring 13 is of frustoconical shape with an outer rounded ridge 21 forming a secondary abutment 17 and, on its inner periphery, a rounded edge 25 with inner ridges 22, 23 in contact respectively with the axial part 14 and the end wing 15 of at least one of the retaining members.

Consequently, during the operation of bending the end wing 15, the inner ridge 22 will not tend to become embedded in the axial part 14, but on the contrary will slide along the said part because of the rounded edge 25.

As emerges clearly from the description, for one and the same cover, the thickness of the ring will be a function of the desired clamping force of the diaphragm. In practice, the thickness of the ring is at least equal to half the thickness of the axial part 14 of the lugs, while being near the said half.

Of course, the invention is not limited to the embodiments described and illustrated but covers all alternative embodiments. In particular, the primary abutment 11 of the cover 1 can be formed by a boss, as shown, or by an open or closed crown fitted into a groove located in the cover.

The same applies to the assembly means which can comprise retaining members obtained directly from the cover and forming one and the same piece with the latter, or retaining members which are independent from one another and are distributed circularly and which possess, in addition to their end wings serving to keep the ring in contact with the Belleville washer, another end wing serving to bring the retaining member up against the cover on the face of the latter opposite that facing the diaphragm, or individual retaining members connected to one another by means of a common bar which extends circumferentially up against the cover on the face of the latter opposite that facing the diaphragm.

Moreover, it will be noted that the ring according to the present invention is mounted on covers with retaining members provided with notches of the prior art.

As will have been appreciated, the positions of the notches and the degree of inclination of the ring are determined specifically for each use, so that there is no interference with the diaphragm during its operation.

What is claimed is:

1. A diaphragm clutch mechanism comprising a generally annular cover, at least one pressure plate fixed to said cover for rotation with said cover and for axial movement relative to said cover, a generally annular diaphragm including an outer peripheral part which forms a Belleville washer for acting on said pressure plate and a central part in the form of raidal fingers for engagement by a clutch release device, and assembly means pivotally securing said diaphragm relative to said cover to urge said diaphragm axially under an elastic clamping load against a primary abutment of said cover, said assembly means including retaining members coupled to said cover, each retaining member having an axial part passing through said diaphragm between said radial fingers and an end wing on said axial part together with said axial part forming a wedging elbow, and a ring wedged in said elbow and engaging said diaphragm in the form of a secondary abutment disposed substantially axially opposite said primary abutment, said clutch mechanism being improved by said ring being solely of a frustoconical shape and having a rounded outer ridge forming said secondary abutment and spaced raidally offset inner ridges in sliding contact with a least certain of said retaining members, one of said inner ridges being in contact with the axial part and the other of said inner ridges being in contact with the end wing of said certain retaining member, said ring having an inner edge positioned between said inner ridges and which is rounded.

2. A diaphragm clutch mechanism comprising a generally annular cover, at least one pressure plate fixed to said cover for rotation with said cover and for axial movement relative to said cover, a generally annular diaphragm including an outer peripheral part which forms a Belleville washer for acting on said pressure plate and a central part in the form of radial fingers for engagement by a clutch release device, and assembly means pivotally securing said diaphragm relative to said cover to urge said diaphragm axially under an elastic clamping load against a primary abutment of said cover, said assembly means including retaining members coupled to said cover, each retaining member having an axial part passing through said diaphragm between said radial fingers and an end wing on said axial part together with said axial part forming a wedging elbow, and a ring wedged in said elbow and engaging said diaphragm in the form of a secondary abutment disposed substantially axially opposite said primary abutment, said clutch mechanism being improved by said ring being solely of a frustoconical shape and having a rounded outer ridge forming said secondary abutment and spaced raidally offset inner ridges in sliding contact with a least certain of said retaining members, one of said inner ridges being in contact with the aixal part and the other of said inner ridges being in contact with the end wing of said certain retaining member, said end wing being bent on the order of 90° relative to said axial part, there being an interior corner between said retaining member axial part and said end wing, a notch in said retaining member in said corner facilitating the individual bending of each end wing relative to its respective axial part to an angle wherein said diaphragm is continuously urged axially under said elastic clamping load, said ring having an inner edge positioned between said inner ridges and which is rounded.

* * * * *